United States Patent
Seymour

(10) Patent No.: US 11,643,162 B2
(45) Date of Patent: May 9, 2023

(54) PERSONAL TRANSPORTATION SYSTEMS

(71) Applicant: Kooler Ice, Inc., Byron, GA (US)

(72) Inventor: Kerry Seymour, Elko, GA (US)

(73) Assignee: KOOLER ICE, INC., Byron, GA (US)

( * ) Notice: Subject to any disclaimer, the term of this patent is extended or adjusted under 35 U.S.C. 154(b) by 19 days.

(21) Appl. No.: 17/464,869

(22) Filed: Sep. 2, 2021

(65) Prior Publication Data
US 2022/0297787 A1  Sep. 22, 2022

Related U.S. Application Data

(60) Provisional application No. 63/200,635, filed on Mar. 19, 2021.

(51) Int. Cl.
| | |
|---|---|
| *B62K 5/027* | (2013.01) |
| *B62K 5/05* | (2013.01) |
| *B62K 23/02* | (2006.01) |
| *B62J 43/10* | (2020.01) |
| *B62J 1/10* | (2006.01) |
| *B62J 45/20* | (2020.01) |
| *B62J 45/41* | (2020.01) |

(52) U.S. Cl.
CPC .............. *B62K 5/027* (2013.01); *B62J 1/10* (2013.01); *B62J 43/10* (2020.02); *B62J 45/20* (2020.02); *B62J 45/41* (2020.02); *B62K 5/05* (2013.01); *B62K 23/02* (2013.01); *B62K 2202/00* (2013.01)

(58) Field of Classification Search
CPC .......... B62K 5/027; B62K 5/05; B62K 23/02; B62K 2202/00
See application file for complete search history.

(56) References Cited

U.S. PATENT DOCUMENTS

| | | | | | |
|---|---|---|---|---|---|
| 4,354,569 | A | * | 10/1982 | Eichholz | B62D 61/08 74/478 |
| 6,095,267 | A | * | 8/2000 | Goodman | B62K 3/002 180/6.5 |
| 6,976,287 | B2 | * | 12/2005 | Muth | B65G 53/42 15/340.1 |

(Continued)

FOREIGN PATENT DOCUMENTS

CN  109843706 B  * 11/2020  ............... B62B 3/00

OTHER PUBLICATIONS

Computer generated English translation of CN-109843706-B to Ishida (Year: 2022).*

*Primary Examiner* — James A English
*Assistant Examiner* — Tiffany L Webb
(74) *Attorney, Agent, or Firm* — McClure, Qualey & Rodack, LLP

(57) ABSTRACT

A representative system includes a personal transportation device with: first and second wheels aligned along an axis; an idler wheel rearward of the axis; a platform configured to support a user in a standing position; electric motors to drive the first and second wheels; first and second hand grips fixed in position at respective locations forward of the platform; and first and second control actuators disposed, respectively, on the first and second hand grips, the first and second control actuators being operative to control rotations of the first and second wheels and configured to be actuated by corresponding thumbs of the user while hands of the user are grasping corresponding ones of the first hand grip and the second hand grip.

14 Claims, 15 Drawing Sheets

(56) References Cited

U.S. PATENT DOCUMENTS

| | | | |
|---|---|---|---|
| 7,717,200 B2* | 5/2010 | Kakinuma | B62D 61/00 |
| | | | 180/218 |
| 9,272,739 B2* | 3/2016 | Zaid | B62D 51/02 |
| 9,757,005 B2* | 9/2017 | Pedlar | A47L 11/145 |
| 10,112,645 B2* | 10/2018 | Ito | B62D 1/02 |
| 10,717,493 B2* | 7/2020 | Chang | B62J 50/22 |
| 10,789,790 B1* | 9/2020 | Vandenbussche | |
| | | | G01C 21/3688 |
| 10,858,057 B2* | 12/2020 | Newhouse | B62K 17/00 |
| 11,001,152 B2* | 5/2021 | Caro Suarez | B60L 3/08 |
| 2014/0008138 A1* | 1/2014 | Kim | B60L 50/66 |
| | | | 180/220 |
| 2016/0270988 A1* | 9/2016 | Diaz-Flores | A61G 5/1024 |
| 2019/0263281 A1* | 8/2019 | Wang | B60L 53/60 |
| 2021/0165404 A1* | 6/2021 | Gillett | B60W 60/005 |
| 2022/0258630 A1* | 8/2022 | Paterson | B60L 53/18 |

* cited by examiner

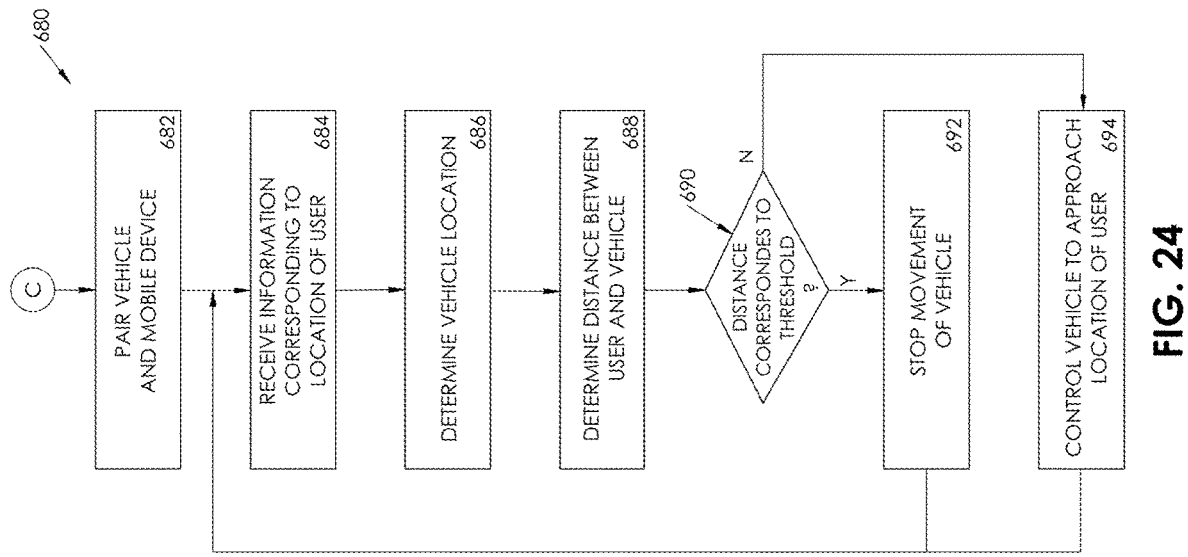

PERSONAL TRANSPORTATION SYSTEMS

CROSS REFERENCE TO RELATED APPLICATION

This utility application claims the benefit of and priority to U.S. Provisional Application 63/200,635, filed on 19 Mar. 2021, which is incorporated by reference herein in its entirety.

BACKGROUND

Statistics show that the average distance a vehicle travels is one to three miles for 45% of all trips. Additionally, vehicle traffic congestion in cities continues to be an issue. In an attempt to address pollution concerns associated with this traffic, many U.S. cities are attempting to comply with the reduced emissions goals of the Paris Climate Agreement and many car manufacturers are embracing electric vehicles.

There are many personal transportation vehicles (PTVs) being introduced to support short distance trips. In the last few years, numerous electric skateboards, scooters, unicycles, bikes, 2-wheeled hoverboards and individual golf carts have been introduced. Unfortunately, the two wheeled variants often require skill and some level of agility or athleticism to ride. As a result, individuals over thirty years of age generally do not have a strong interest in the PTV market unless they pursue a four wheeled vehicle or a larger sit-down scooter-type vehicle. Since the price/value relationship for these vehicles is generally not well received, the larger vehicles tend to perform as a niche product, thus limiting the true opportunity for the industry. For a PVT to become mainstream, it should be stable, safe and affordable. Thus, there exists a need to address these and/or other perceived shortcomings of the prior art.

SUMMARY

Broadly stated, the present disclosure involves personal transportation systems. In at least one embodiment, such a system comprises: a personal transportation vehicle defining a front and a rear and having a first wheel, a second wheel, an idler wheel, a platform, a first electric motor, a second electric motor, a first hand grip, a second hand grip, a first control actuator and a second control actuator; the first wheel and the second wheel being spaced from each other and aligned along an axis; the platform being disposed rearward of the axis and configured to support thereon a user in a standing position; the idler wheel being disposed rearward of the axis, wherein the first wheel, the second wheel and the idler wheel support the platform; the first electric motor being configured to drive the first wheel; the second electric motor being configured to drive the second wheel; the first hand grip and the second hand grip being fixed in position relative to the platform at respective locations forward of the platform, the first hand grip and the second hand grip being configured to be grasped by the user while in the standing position on the platform; the first control actuator being disposed on the first hand grip and the second control actuator being disposed on the second hand grip, the first control actuator being disposed on one of the first hand grip and the second control actuator being disposed on another of the first hand grip and the second hand grip, the first control actuator being operative to control rotations of the first wheel and the second wheel to provide forward and reverse motion of the personal transportation vehicle, the second control actuator being operative to control rotations of the first wheel and the second wheel to provide turning of the personal transportation vehicle, the first control actuator and the second control actuator being configured to be actuated by corresponding thumbs of the user while hands of the user are grasping corresponding ones of the first hand grip and the second hand grip.

In some embodiments, the platform is disposed at a height that is higher than a height of the axis.

In some embodiments, a personal transportation system further comprises a docking station having a base, the base having an upper planar surface upon which the first wheel, the second wheel and the idler wheel are configured to drive and be positioned when the personal transportation vehicle is in a docked position at the docking station.

In some embodiments, the docking station further comprises a guide assembly and a charging connector, the charging connector being disposed above the upper planar surface, the guide assembly having a guide arm disposed above the upper planar surface and extending away from the charging connector, the guide arm being configured to align the personal transportation vehicle to dock with the docking station.

In some embodiments, the guide arm defines a guide channel; and the personal transportation vehicle further comprises a guide rail disposed between the first wheel and the second wheel, the guide rail being configured to be received by the guide channel to align the personal transportation vehicle to dock with the docking station.

In some embodiments, the personal transportation vehicle further comprises: a battery configured to power the first electric motor and the second electric motor; and a charging port disposed at the front, the charging port being configured to mate with the charging connector, when the personal transportation vehicle is in a docked position, to receive a charge for recharging the battery.

In some embodiments, the first actuator and the second actuator are thumb wheels.

In some embodiments, the personal transportation vehicle further comprises a seat movable between a stowed position, in which the seat is disposed forward of the platform and an extended position, in which the seat extends at least partially over the platform.

In some embodiments, the personal transportation vehicle further comprises a frame assembly configured to support the platform, the first electric motor and the second electric motor.

In some embodiments, the frame assembly is formed of metal tubing.

In some embodiments, the personal transportation vehicle is selectively operative in a manual mode and an automatic mode; in the manual mode, the personal transportation vehicle is driven by manual operation of the first actuator and the second actuator; and in the automatic mode, the personal transportation vehicle is driven responsive to information received from outside of the personal transportation vehicle.

In some embodiments, the personal transportation vehicle further comprises a controller and a receiver; the receiver is configured to receive information from a mobile device paired to the personal transportation vehicle; and the controller is configured to use the information received from the mobile device to drive the personal transportation vehicle when in the automatic mode.

In some embodiments, the automatic mode is a remote control mode in which the information provided from the mobile device corresponds to user inputs for driving the personal transportation vehicle.

In some embodiments, the automatic mode is a follow mode in which the information provided from the mobile device corresponds to GPS location information of the mobile device; and the controller is configured to use the GPS location information received from the mobile device to drive the personal transportation vehicle to maintain a preset distance from the mobile device.

In some embodiments, the personal transportation vehicle further comprises a LIDAR assembly configured to acquire information corresponding to user gestures.

In some embodiments, when in a follow mode, the controller is configured to determine presence of a first user gesture corresponding to a stop command, responsive to which the controller pauses driving of the personal transportation vehicle to maintain the preset distance from the mobile device.

In some embodiments, the LIDAR assembly is further configured to acquire information corresponding to an obstruction located along a travel path of the personal transportation vehicle; and the controller, responsive to receipt of the information, is configured to drive the personal transportation vehicle to avoid the obstruction.

In some embodiments, the personal transportation vehicle is a first personal transportation vehicle; and the personal transportation system further comprises a second personal transportation vehicle.

In some embodiments, the personal transportation system further comprising a control center operative to receive information from the first personal transportation vehicle and the second personal transportation vehicle.

Additional objects and/or advantages may become apparent to those skilled in the art from the following detailed description, accompanying drawings and claims.

BRIEF DESCRIPTION OF THE DRAWINGS

FIG. 24 is a flowchart showing a method (functionality) associated with an example embodiment of a follow operations system.

DETAILED DESCRIPTION

For ease in explanation, the following discussion describes several embodiments of a personal transportation system. It is to be understood that the invention is not limited in its application to the details of the particular arrangements shown since the invention is capable of other embodiments. Also, the terminology used herein is for the purpose of description and not of limitation.

Figure 1:
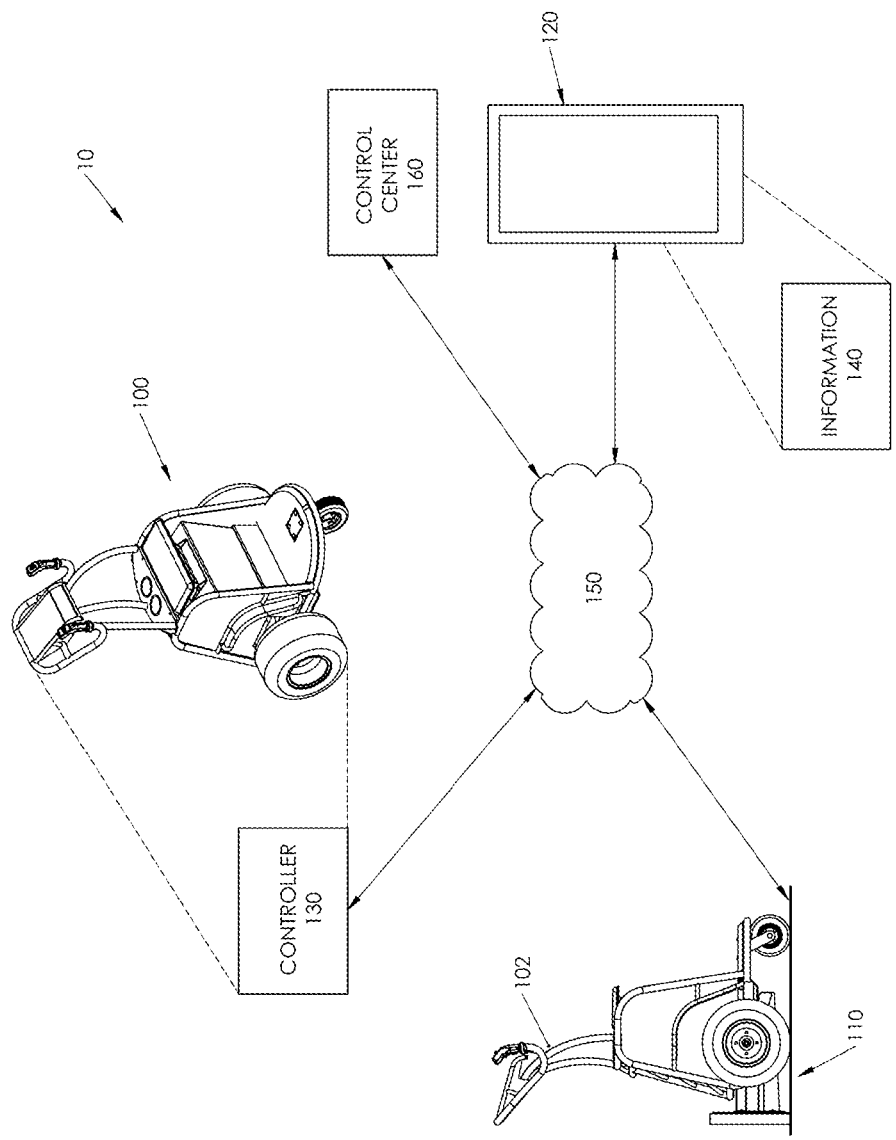
FIG. 1 is a schematic diagram of an example embodiment of a personal transportation system.
Figure 3:
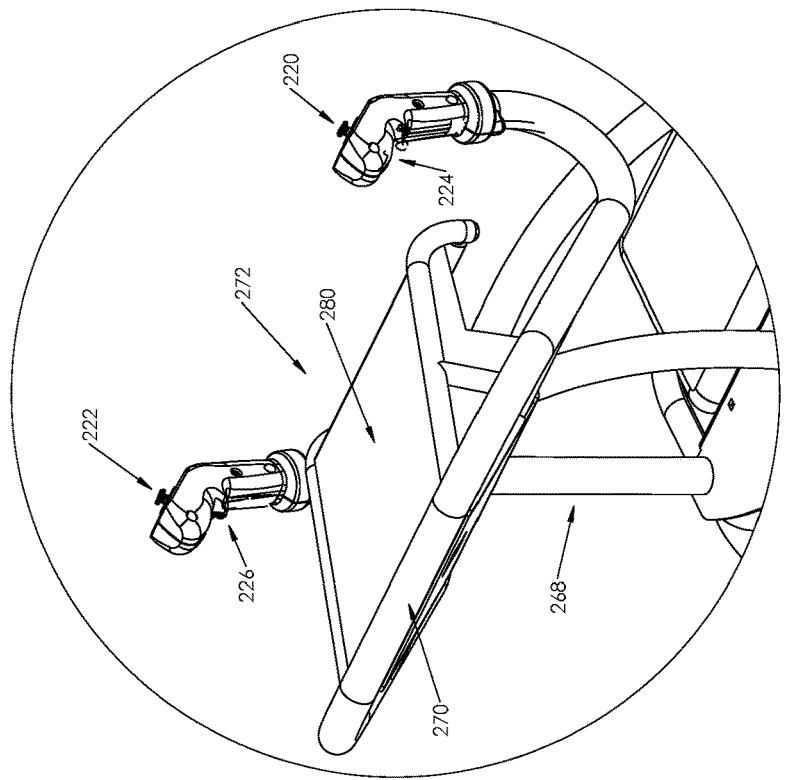
FIG. 3 is a partially cutaway view of the embodiment of FIG. 2 showing detail of the handle bar assembly.

As will be described in detail, various embodiments of a personal transportation system involve one or more personal transportation vehicles, which themselves are provided in various embodiments. In this regard, FIG. 1 depicts an example embodiment of a personal transportation system 10 that incorporates personal transportation vehicles (100 and 102) and a docking station 110. Each of the personal transportation vehicles is configured to transport a user while the user stands upright and grasps hand grips of the vehicle. Docking station 110 is configured to receive a personal transportation vehicle and facilitate recharging of one or more batteries that are used to power the vehicle.

As shown in FIG. 1, personal transportation vehicle 100 communicates with a mobile device 120 (a mobile phone of a user, for example). In particular, personal transportation vehicle 100 includes a controller 130 that is configured to communicate information (e.g., information 140) wirelessly from and/or to mobile device 120 via a communication network 150 for performing various functions. In some embodiments, personal transportation vehicle 100 is selectively operative in a manual mode and an automatic mode. For instance, in the manual mode, a user riding the personal transportation vehicle 100 controls the vehicle by manual operation of one or more vehicle-mounted actuators. In contrast, in the automatic mode, personal transportation vehicle 100 is controlled in response to information communicated to and/or from controller 130. Thus, in the automatic mode, a user does not need to be riding the personal transportation vehicle to control movement of the vehicle. As an example, in some embodiments, an automatic mode may be used to ensure that a personal transportation vehicle without a rider returns to a docking station for charging.

Also shown in the embodiment of FIG. 1 is a control center 160. This optional feature may be used to receive and/or provide information from/to one or more personal transportation vehicles. In particular, control center 160 may be configured to monitor operations (operating parameters, for example) of the vehicles and/or direct various functions, such as initiating an automatic mode of operation to facilitate return of a vehicle to a docking station, for instance.

Figure 2:
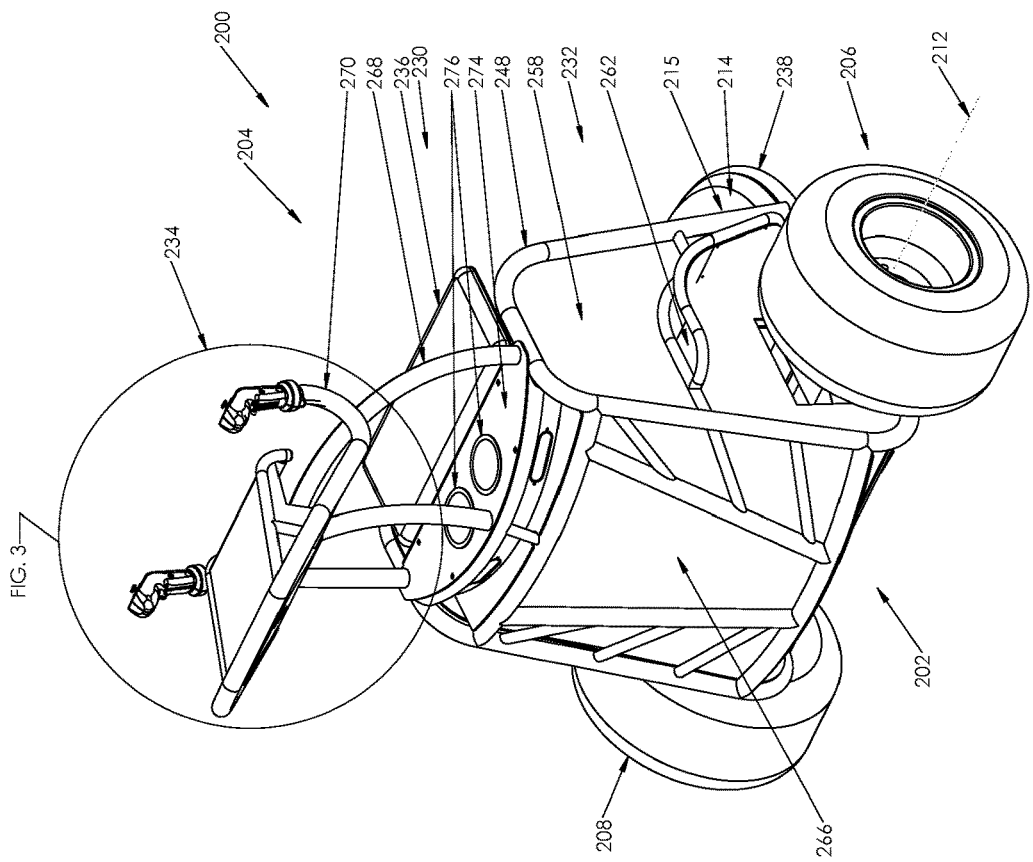
FIG. 2 is a perspective view of an example embodiment of a personal transportation device.
Figure 5:
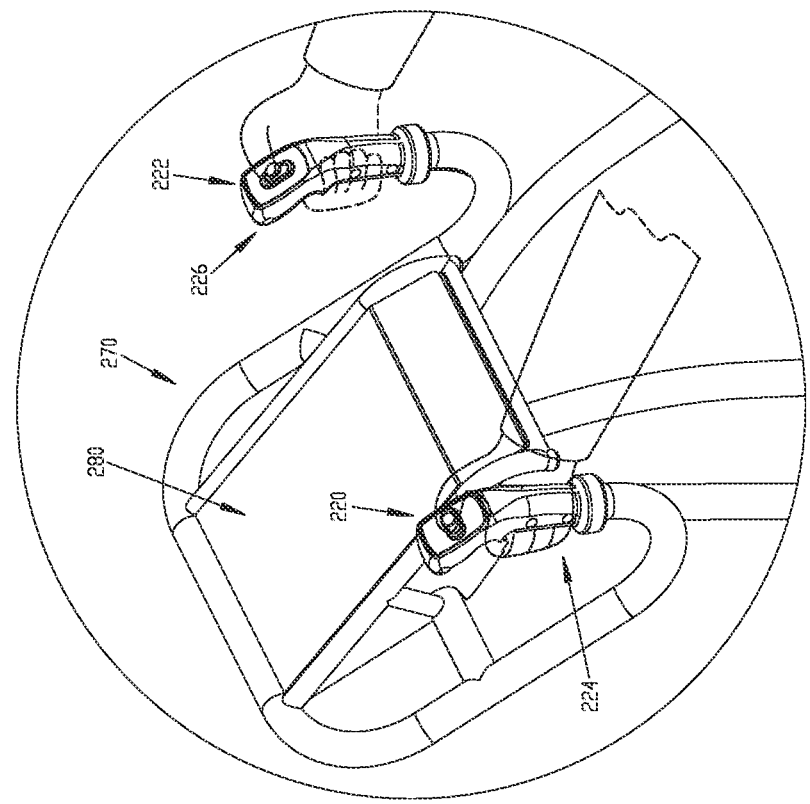
FIG. 5 is a partially cutaway view of the embodiment of FIG. 4 showing detail of the handle bar assembly.
Figure 4:
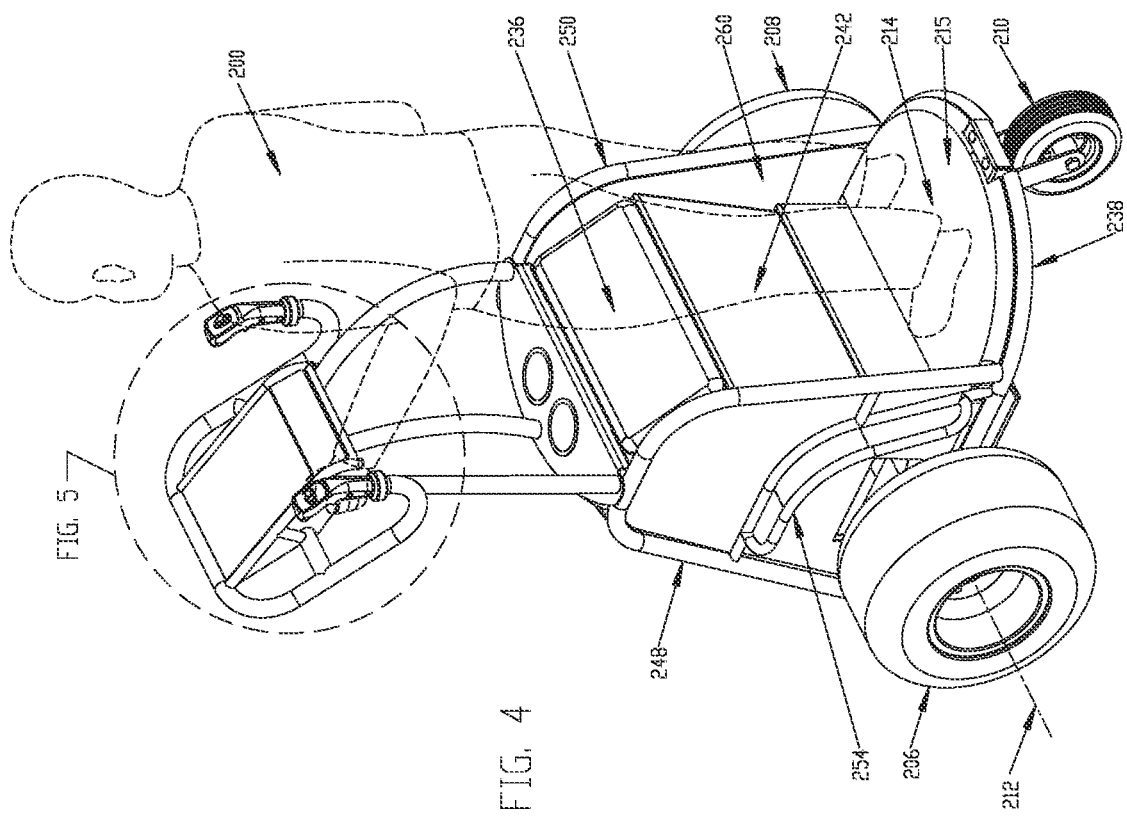
FIG. 4 is another perspective view of the embodiment of FIGS. 2 and 3.
Figure 7:
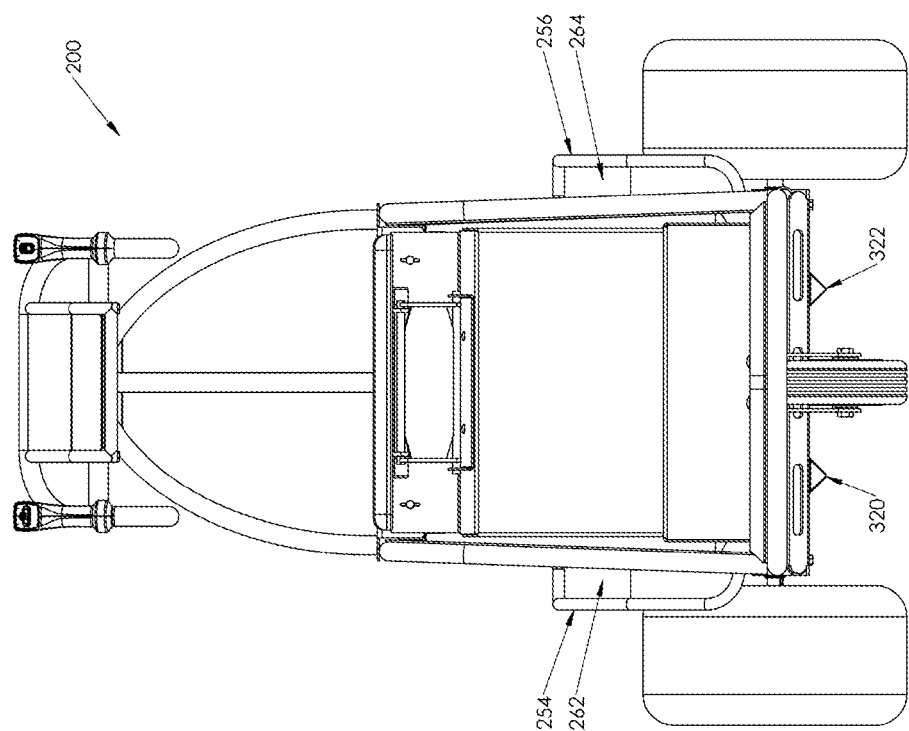
FIG. 7 is a rear view of the embodiment of FIGS. 2-6.
Figure 6:
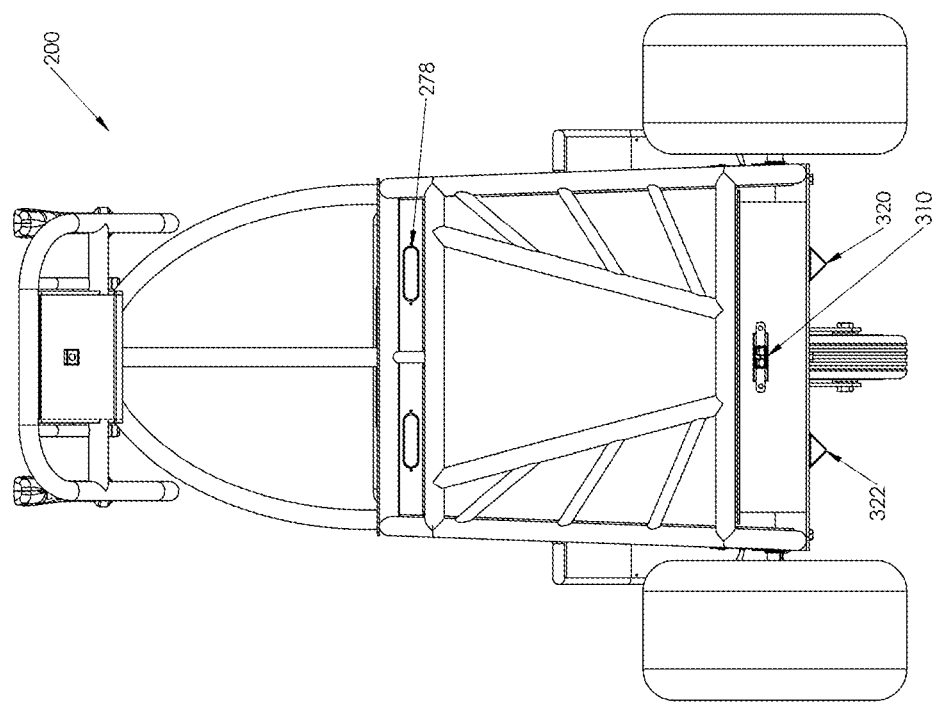
FIG. 6 is a front view of the embodiment of FIGS. 2-5.

An example embodiment of a personal transportation vehicle 200 is depicted in FIGS. 2-11. As shown in FIG. 2, personal transportation vehicle 200 defines a front 202 and a rear 204, and includes a first wheel 206, a second wheel 208 and an idler wheel 210. First wheel 206 and second wheel 208 are spaced from each other and aligned along an axis 212, with idler (non-powered) wheel 210 (FIG. 4) being disposed rearward of axis 212. A platform 214 also is disposed rearward of axis 212 and is configured to support a user in a standing position with feet of the user positioned on the platform. Note that platform 214 is optionally disposed in this embodiment at a height that is higher than a height of axis 212. In this three-wheeled embodiment, first wheel 206, second wheel 208 and idler wheel 210 support and provide stability to platform 214.

Personal transportation vehicle 200 also incorporates a first electric motor 216 (FIG. 10) configured to drive first wheel 206 and a second electric motor 218 configured to drive second wheel 208. A first control actuator 220 and a second control actuator 222 (e.g., thumb wheels) are mounted to vehicle 200 to control movement of the vehicle when in a manual mode. In particular, first control actuator 220 is disposed on a first hand grip 224 and second control actuator 222 is disposed on a second hand grip 226. First hand grip 224 and second hand grip 226 are fixed in position relative to platform 214 at respective locations forward of the platform (and, in some embodiments, forward of a vertical plane defined by axis 212). First control actuator 220 is operative to control first electric motor 216 and second electric motor 218 to control rotations of first wheel 206 and second wheel 208 to provide forward and reverse motion of the vehicle; second control actuator 222 is operative to control first electric motor 216 and second electric motor 218 to control rotations of first wheel 206 and second wheel 208 to provide left and right turning of the vehicle.

In some embodiments, first control actuator 220 and second control actuator 222 are configured to be actuated by corresponding thumbs of a user while the hands of the user are grasping corresponding ones of the hand grips and while the user is in the standing position on the platform. By way of example, the actuators 220, 222 may be TW series hall effect-type thumb wheel actuators to give the user comfort and natural ease of operation. Preferably, forward and reverse functions are provided by one actuator (e.g., second control actuator 222 on the right side) and turning functions are provided by the other (e.g., first control actuator 220 on the left side). However, the functions may be swapped between the actuators based on user preferences. The throttle and steering controls associated with the actuators are housed in an ergonomically designed plastic housing that may be attached to the handle bar assembly. In some embodiments, the actuators themselves are attached to the throttle control board with Molex type connectors for easy plug-and-play replacement.

In some embodiments, the electric motors (216, 218) are provided in a drive assembly 228, which mounts and aligns the drive components to define axis 212. Note that axis 212 may not be co-axially aligned with the rotational axes of the electric motors. The electric motors (216, 218) may be inline gear motors (such as those manufactured by Dumore) with a 33.1:1 gear reduction, for example. Motors of this type are 24 v DC sealed motors that can run in wet conditions, but not submersed in water. This configuration provides a top travel speed of between 11 and 14 mph, which should be appropriate for a range of applications.

The electric motors are also configured to power associated electric brakes. Each of the electric motors also is provided with a mechanical brake, with an external mechanical lock being configured to engage the mechanical brake and to secure the electric motors in place when the electric motors are not energized. The mechanical locks can also be physically disengaged to allow the vehicle to free-wheel for moving (such as by pushing) when not under power. In some embodiments, a free-wheel release is located on the rear motor base. If the battery were to run out of charge, the mechanical brakes are configured to engage, locking the wheels of the vehicle until the free-wheel release is manually actuated. To engage or disengage the mechanical brakes, a leaver is provided inside the front shroud that can be easily pulled or pushed to engage or disengage the brakes as needed. The default for the manual brakes is to stay engaged in case of power loss.

In some embodiments, each motor output shaft is 1 inch diameter to accommodate the max load of 750 lbs. Preferably, each output motor shaft is pre-designed to accept snap rings to locate the wheel hubs in the correct location for different types of wheels. The motor output shaft is designed to accept either a hub to hold a wheel or a wheel directly to the shaft. Motor output shafts my also be keyed (e.g., to accept a 0.25" key) to secure the wheel hub in the correct location and deliver the appropriate torque to the wheel.

In some embodiments, each output motor shaft may be pre-drilled with a ½-20 female thread to secure the wheel or hub to the shaft. In an assembled configuration, the output motor shaft (e.g., output motor shaft 227 of FIG. 10) may protrude outwardly from the end of the motor housing with a CUI encoder attached directly to the motor shaft. The motor housing also may be pre-drilled to attach a CUI encoder to the housing.

First wheel 206 and second wheel 208 (drive wheels) can be various sizes and widths, but preferably do not to exceed 20 inches in height or 8 inches width. In some embodiments, the tires of the wheels are filled (such as with foam) to always keep the same outer diameter, which ensures that the vehicle is able to drive in a straight line. A drive wheel can either attach to a hub or be installed directly to the output motor shaft. The drive wheels are able to be switched out for different riding applications and terrain.

Idler wheel 210 (e.g., a caster wheel) can be provided in various sizes. Preferably, the size of idler wheel 210 does not exceed 12 inches in height or 5 inches in width. Idler wheel 210 preferably is easily removable to be able to swap from outdoor to plant or city use, for example. When operating in a plant environment, a smaller idler wheel may be more useful. When operating outdoors, a larger idler wheel may be used to reduce ground pressure and to increase traction. Idler wheel 210 is positioned for stability, safety, and zero-turn ability of the vehicle, and also may be foam filled for better and reliable steering control. The caster assembly that incorporates idler wheel 210 may be attached to the underside of the vehicle, such as with carriage head bolts to create a relatively flat surface at the platform for the standing area.

Figure 12:
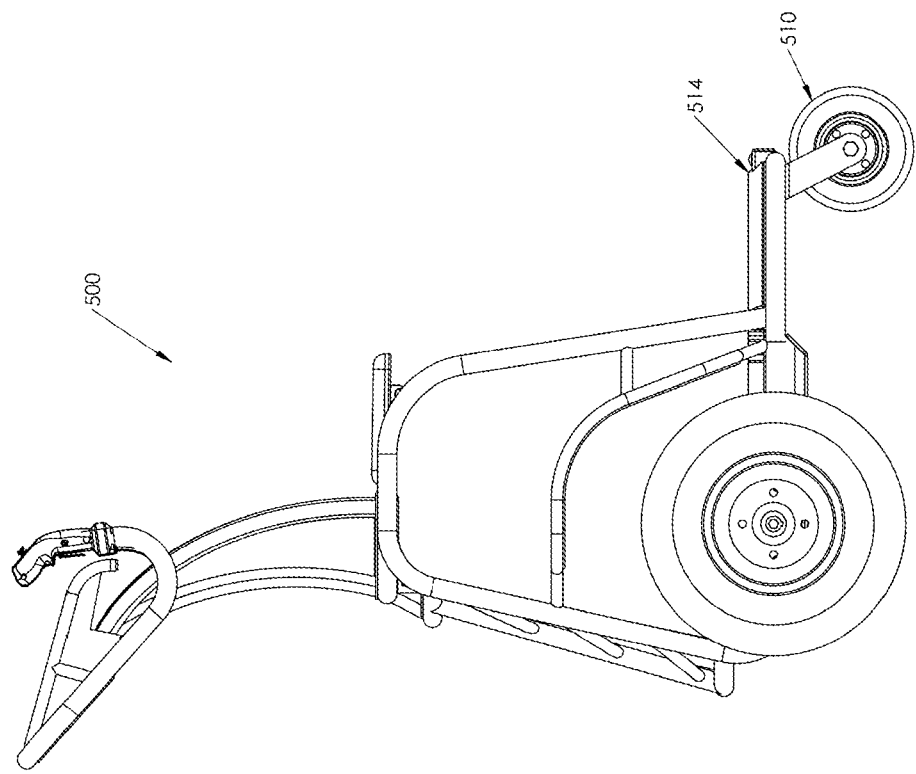
FIG. 12 is a side view another example embodiment of a personal transportation device.
Figure 15:
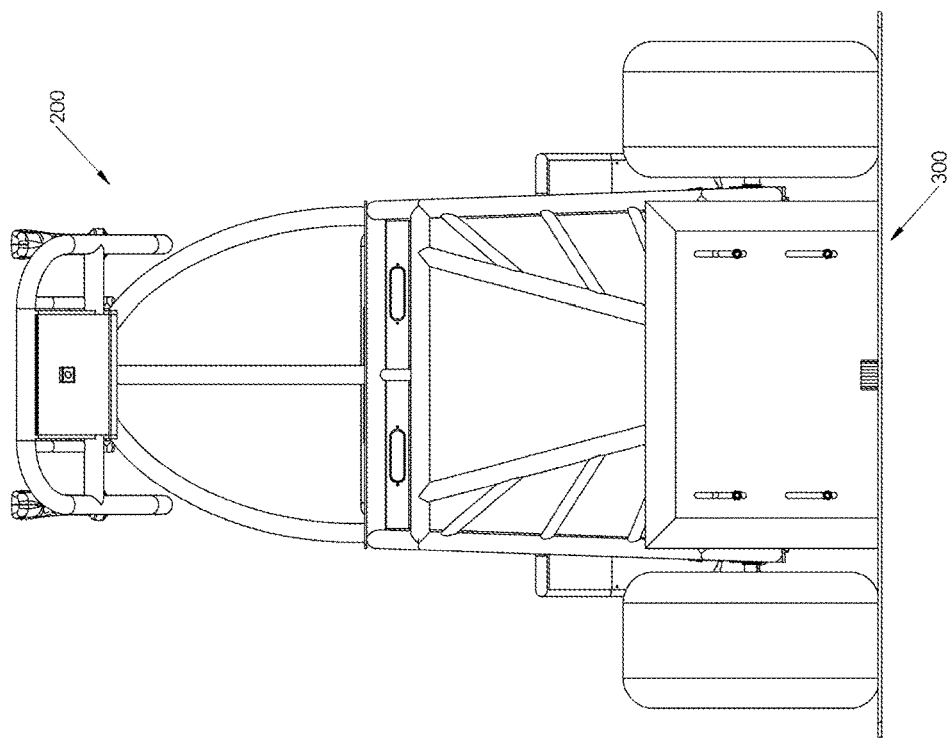
FIG. 15 is a front view of an embodiment of a personal transportation device docked at an example embodiment of a docking station.

In the embodiment of FIG. 12, a personal transportation vehicle 500 incorporates an idler wheel 510 that is displaced further to the rear than idler wheel 210, with the center of rotation of idler wheel 510 be generally vertically aligned with the rear of platform 514.

Figure 13:
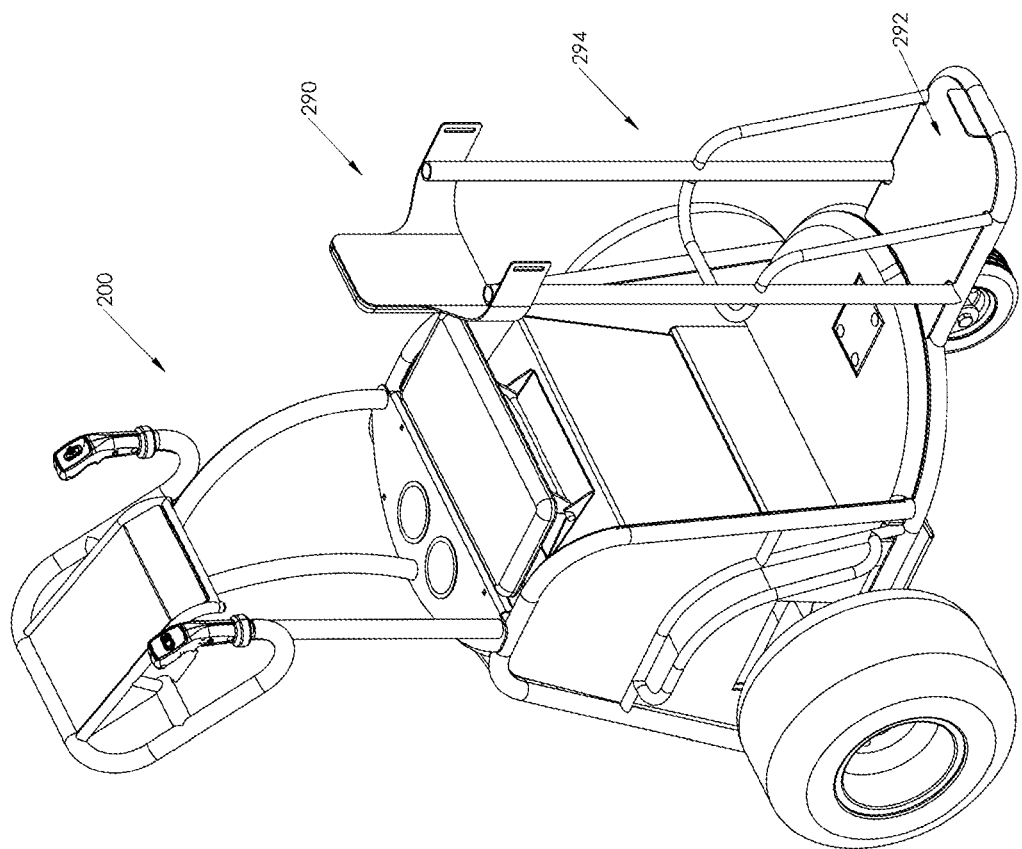
FIG. 13 is another view of an embodiment of a personal transportation device showing detail of an optional utility rack.

As shown in FIG. 13, personal transportation vehicle 200 incorporates an optional utility rack 290 that includes a base 292 that forms an extension of platform 214. Bases 292 extends generally outwardly from idler wheel 210 and supports an upwardly extending support frame 294, which is configured to accommodate a golf bag (not shown), although various other configurations may be used in other embodiments.

Figure 14:
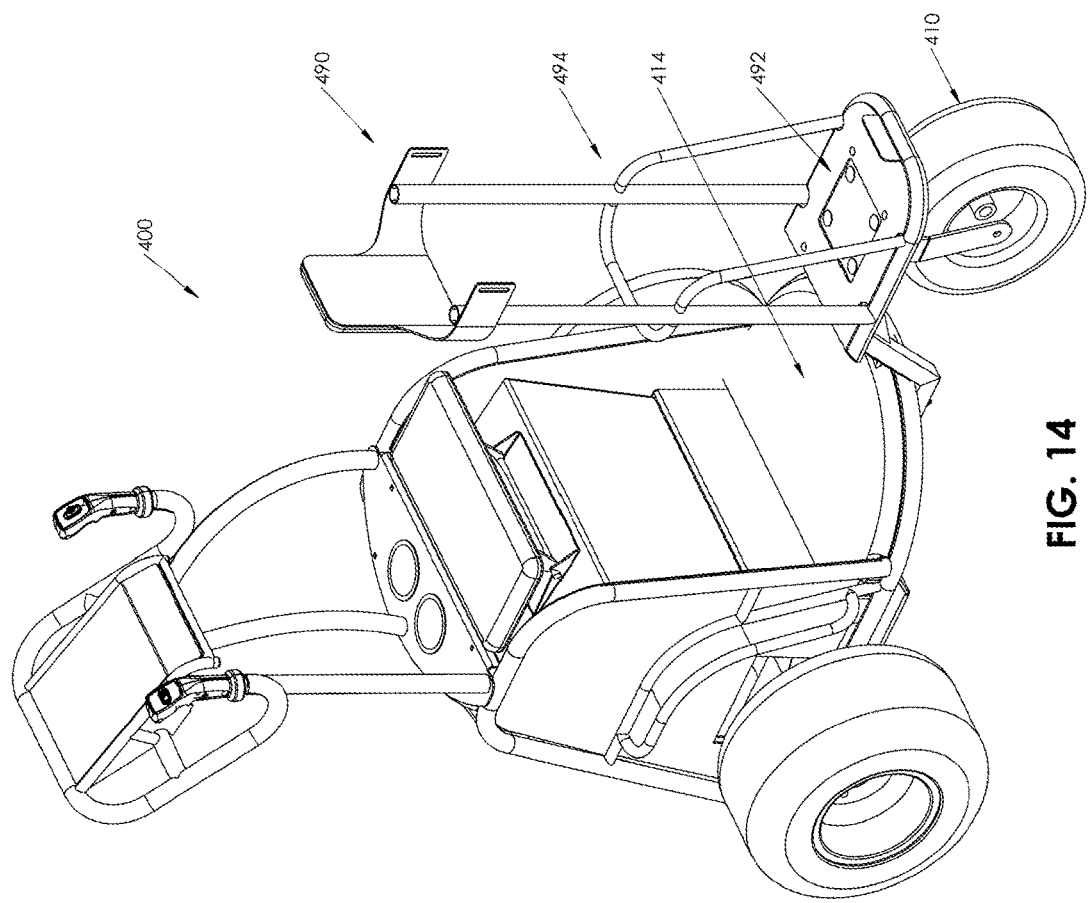
FIG. 14 is a side view another example embodiment of a personal transportation device.
Figure 17:
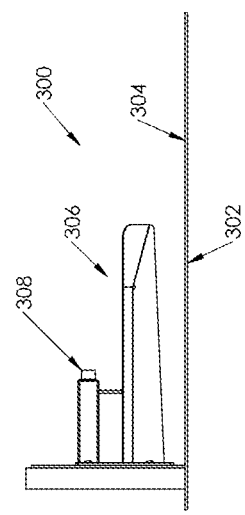
FIG. 17 is a side view of the embodiment of the docking station of FIGS. 15 and 16.
Figure 16:
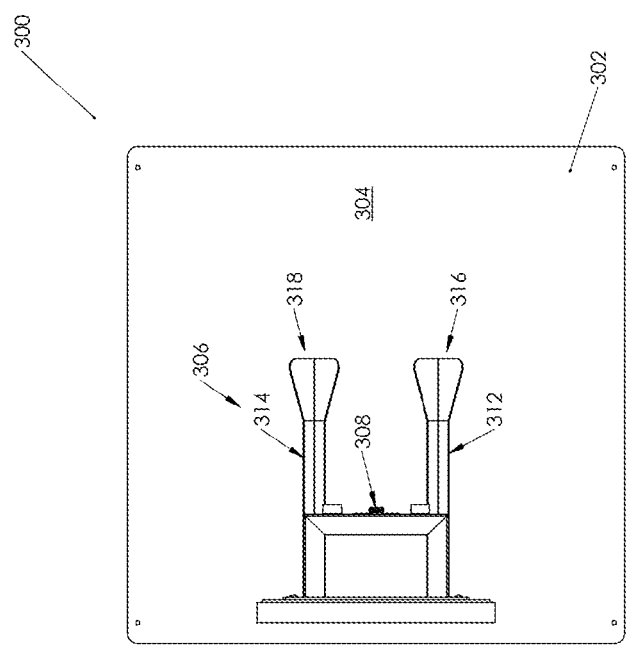
FIG. 16 is a top view of the embodiment of the docking station of FIG. 15.
Figure 19:
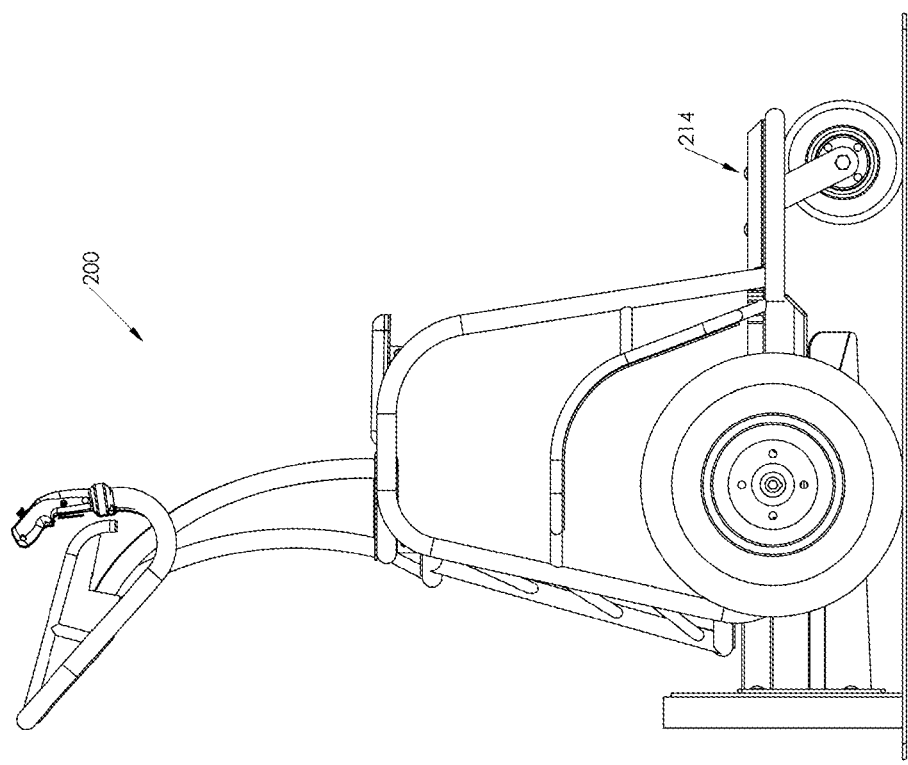
FIG. 19 is a side view of the embodiment of the personal transportation device of FIGS. 2-10 docked with the embodiment of the docking station of FIGS. 15-17.

As another example, an embodiment of a personal transportation vehicle 400 that incorporates an optional utility rack is shown in FIG. 14. In FIG. 14, utility rack 490, in addition to including a base 492 and a support frame 494, includes a large idler wheel 410. In this embodiment, base 492 is detached from and disposed higher than platform 414. This positioning accommodates placement of the large idler wheel 410 under base 492.

Referring back to the embodiment of FIGS. 1-10, a frame assembly 230 support various components of vehicle 200 and includes a lower frame assembly 232 and an upper frame assembly 234 that are detachable for ease of shipment. Preferably, frame assembly 230 is formed of metal tubing (e.g., aluminum tubing with a circular cross-section) and plate metal (e.g., aluminum plate) to reduce weight and provide a rust-free extended life. Frame assembly 230 may be painted, such as by using a powder coating. In some embodiments, overall width of vehicle 200 is maintained at or below 29 inches to promote door clearance. Additionally, in some embodiments, weight capacity is up to 750 lbs.

Lower frame assembly 232 provides support for various components of vehicle 200, such as platform 214, wheel 206, 208, 210, and electric motors 216, 218. Preferably, lower frame assembly 232 is able to accommodate different wheel and/or electric motor configurations, such as by use of bolt-on type attachments. For instance, idler wheel 210 may be easily removed and replaced a different wheel configuration to accommodate drive tires of different sizes. Lower frame assembly 232 also is able to accept optional attachments such as baskets, harnesses, tow hooks, umbrellas and/or other accessories at various locations about the vehicle (front and sides, for example).

A seat 236 is mounted to lower frame assembly 232 that is movable between a stowed position and an extended position. In the stowed position (FIG. 4, for example), the seat is disposed generally forward of platform 214, whereas, in the extended position (FIG. 2, for example), seat 236 extends at least partially over the platform. Note that, in this embodiment, platform 214 supports a foot pad 215, which is cushioned to reduce vibrations experienced by a user riding the vehicle. Lower frame assembly 232 also is configured to accept plastic graphics for different aesthetic looks depending upon the application.

Figure 9:
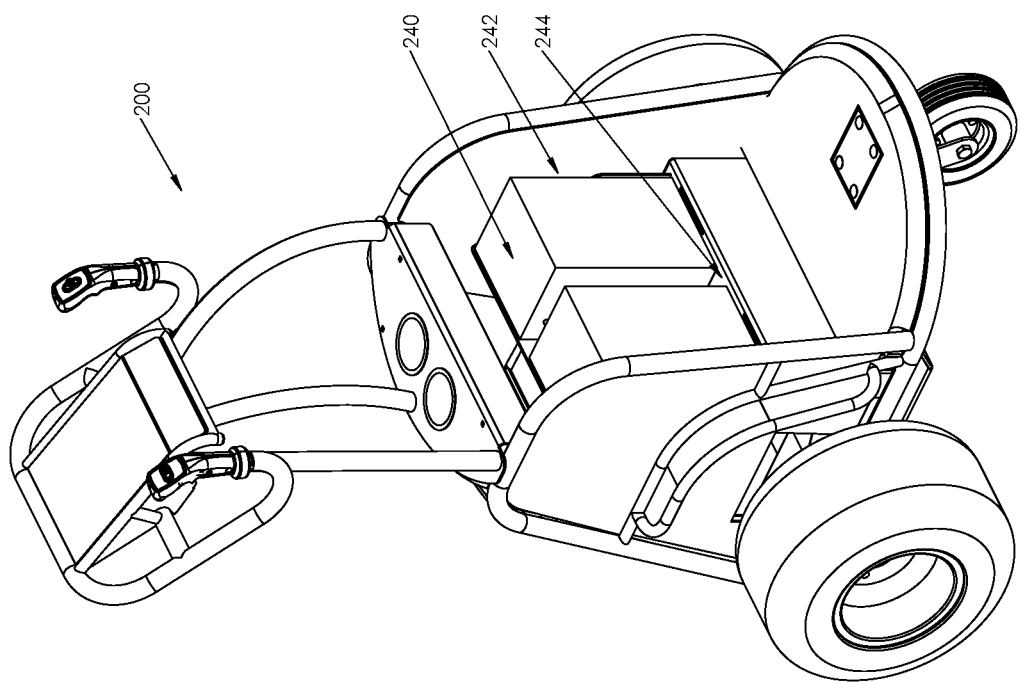
FIG. 9 is another view of the embodiment of FIGS. 2-8 with the battery cover removed.
Figure 8:
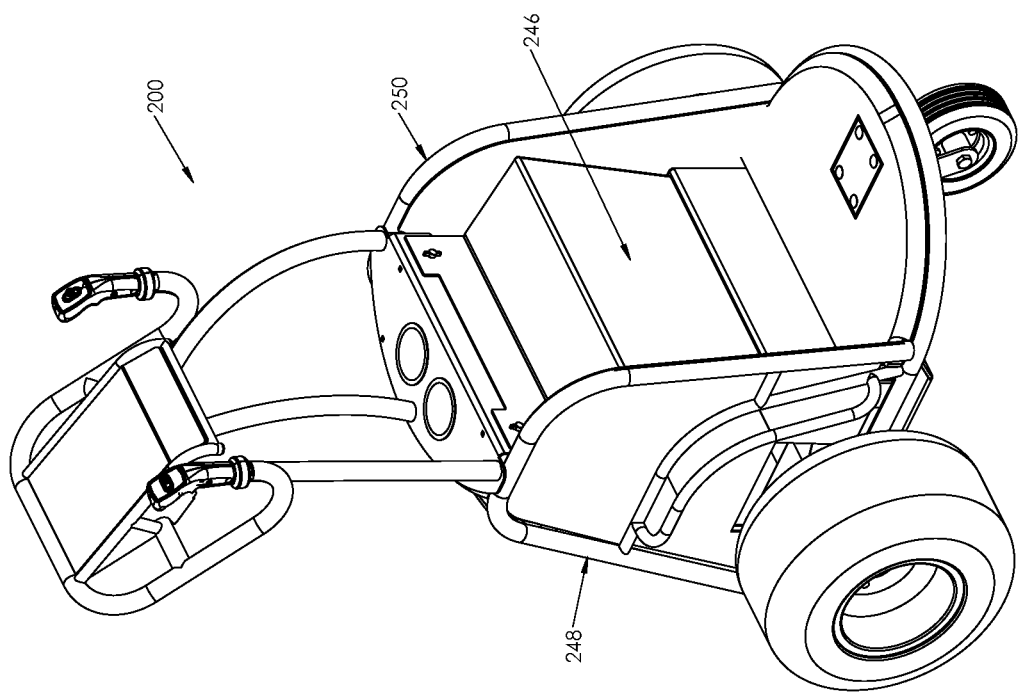
FIG. 8 is another view of the embodiment of FIGS. 2-7 with the seat removed.
Figure 11:
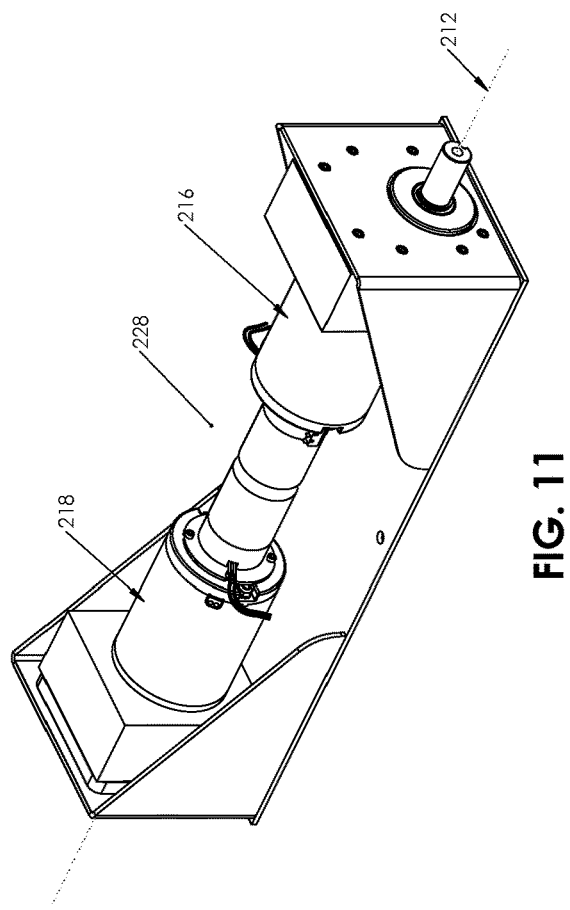
FIG. 11 is a perspective view of an example embodiment of a motor assembly.
Figure 10:
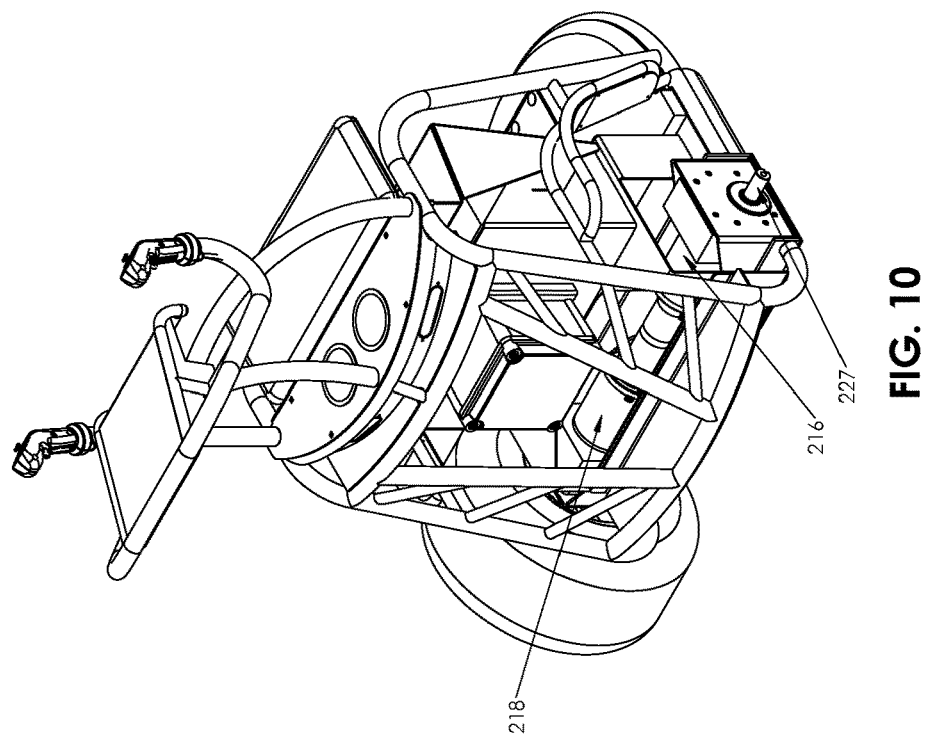
FIG. 10 is a partially disassembled view of the embodiment of FIGS. 2-9.

Lower frame assembly 232 incorporates a base framing member 238 that extends about an outer perimeter at the base of vehicle 200. Base framing member 238 supports platform 214, as well as internal components of vehicle 200, such as electric motors 216, 218 and a battery 240 (FIG. 9). Notably, battery 240 is disposed within a compartment 242 on a battery shelf 244 and may be accessed by via a removable battery cover 246 (FIG. 8). In some embodiments, at least two batteries (e.g., lead acid batteries) are used. Lower frame assembly 232 may incorporate slots in the battery storage area to accommodate straps to secure the batteries in place. Batteries of various types (lead acid, lithium-Ion, etc.) may be used depending upon the application. It should be noted that various power and charging configurations may be used depending upon the number of batteries. For instance, when two batteries are provided, both may be used to power each of the electric motors and both may be charged simultaneously.

Lower frame assembly 232 also incorporates side framing members 248, 250 that are disposed on left and right sides of vehicle 200, respectively. Each of the side framing members 248, 250 is generally configured as an inverted "U" with the free ends of the members intersecting base framing member 238. Front framing members 252 span between side framing members 248 and 250 at the front 202 of the vehicle. Fenders 254, 256 protrude outwardly from corresponding side framing members 248, 250, with each intersecting base framing member 238 and extending upwardly and toward the front of the vehicle. In some embodiments, one or more of the framing members may be configured to accommodate mounting of corresponding panels that may be designed to alter the aesthetics of the vehicle. By way of example, removable side panels (258, 260), fenders panels (262, 264) and/or a front panel (266) may be used that can be formed of various materials, such as plastic or polycarbonate.

Upper frame assembly 234 includes support framing members 268 and handle bar assembly 270, and is configured to attach (such as by bolting) to lower frame assembly 232. In an assembled configuration as depicted, support framing members 268 extend upwardly from lower frame assembly 232 and set a position of handle bar assembly 270. A display console 272 is mounted to handle bar assembly 270 that provides a visual display of one or more parameters. A tray 274, which is mounted to support framing members 268, accommodates one or more cup holders (e.g., cup holder 276). Notably, tubing used to form upper frame assembly 234 is configured to secure and hide all control wiring within the diameter of the tubing to protect the wiring and keep the look clean.

Additionally, upper frame assembly 234 mounts optional components, such as one or more headlights (e.g., headlight 278), displays (e.g., display 280), speakers, horns (audible alert/sound for safety), power outlets (e.g., aux plug or USB), and/or various controls/switches. In some embodiments, LED accent lighting, which may be flush mounted in the shroud, is provided to be available for different shroud configurations.

One or more of these components may be enclosed to protect electronics and to keep the look clean. In some embodiments, these components may include a Sabretooth 2×60 motor control board, a Kangaroo×2 encoder control board and a Prism Systems throttle control board. In some embodiments, a disconnect (e.g., a shut-off switch) is provided to shut off power between the batteries, controls boards and motors. The disconnect may be located inside the battery compartment. One or more breakers (or fuses) may also be provided to protect motors and wiring from overload.

Handle bar assembly 270 mounts first hand grip 224 and second and grip 226, each of which is generally oriented in a vertical position. The hand grips are configured to provide a user of the vehicle with components for grasping for safety and security while simultaneously permitting the user to control operation of the vehicle with associated actuators. Preferably, first hand grip 224 and second and grip 226 are mounted 48 inches or less from the top of platform 214.

In some embodiments, upper frame assembly 234 may include a connecting point (e.g., a ring) at the top center for towing of the vehicle. As with lower frame assembly 232, upper frame assembly 234 may also accommodate mounting of panels that may be designed to alter the aesthetics of the vehicle.

With respect to operating a personal transportation vehicle, various operating parameters may be adjusted (such as based on user preferences from 0% to 100%) and/or provided with preset (default) settings. This allows the user to control the speed of operation to the range that feels comfortable. By way of example, settings may include those for beginner, intermediate, and expert, and may be adjusted via a corresponding control input, which, in some embodiments, may be facilitated by a user interface of an application accessible using a mobile device. If a parameter is changed, preferably, the change is recorded but can also be reset back to default settings if desired. A unique vehicle identifier (a serial number, for example) may be used to correlate reports of settings with the associated vehicle.

The following are representative operating parameters for indoor (flat, solid surface) use.

Max forward speed—0% to 100%, this controls the actual overall speed of the vehicle in the existing mode.

Minimum forward speed—0% to 100%, this controls the minimum forward speed in the existing mode.

Forward acceleration—0% to 100%, this controls how fast the vehicle accelerate forward.

Forward deceleration—0% to 100%, this controls how fast the vehicle decelerates forward.

Max reverse speed—0% to 100%, this controls max reverse speed.

Minimum reverse speed—0% to 100%, this controls the minimum reverse speed.

Reverse acceleration—0% to 100%, this controls how fast the vehicle accelerates in reverse.

Reverse deceleration—0% to 100%, this controls how fast the vehicle decelerates in reverse.

Max turn speed—0% to 100%, this controls how fast the vehicle turns in zero turn scenario.

Min turn speed—0% to 100%, this also controls how fast the vehicle turns in a zero-turn scenario.

Turn acceleration—0% to 100%, this controls how fast the vehicle accelerates in a zero-turn scenario.

Turn deceleration—0% to 100%, this is how fast the vehicle slows down in a zero-turn scenario.

Turn transition forward—0% to 100%, this is how fast the vehicle turns/responds while moving forward. (The faster the vehicle travels, the slower the turning needs to be to avoid over correcting.)

Turn transition reverse—0% to 100%, this is how fast the vehicle turns/responds while moving in reverse. (Same as above, but not nearly as hard to adjust since the speed is usually much slower).

Power—0% to 100%, this controls how fast/strong the vehicle functions in the existing mode.

Load/Terrain compensation—0% to 100%, ability to recognize above average load (over 250 lbs) and compensate in every setting.

For outdoor/off-road (rougher terrain) use, it is anticipated that the above parameters should be adjusted as needed to accommodate the travel surface and/or tire size/configuration.

Parameters may also be provided for throttle control.

Neutral window forward and reverse—0% to 100%, how far the thumb dial needs to be deflected before the vehicle will move forward or reverse.

Neutral window right and left—0% to 100%, how far the thumb dial needs to be deflected before the vehicle turns right or left.

Throttle throw—0% to 100%, how far the thumb dial needs to be deflected before the vehicle reaches full speed in either direction.

Directional throw—0% to 100%, how far the thumb dial needs to be deflected before the vehicle makes a hard right and left turn.

Dampening—0% to 100%, sets the amount of tremor or erratic movement that is dampened as a percentage of the thumb dial movement.

Drive delay at start-up—0 to 10 sec, sets a time delay to be set up between when the vehicle is powered up and able to drive.

With respect to data acquisition and usage, various components may be used to sense/detect conditions associated with a personal transportation vehicle. By way of example, some embodiments may be equipped to monitor battery life (e.g., percentage of charge remaining) and provide an alarm (e.g., an audible alarm) when battery life corresponds to a predetermined threshold. Additionally or alternatively, the following may be monitored: amp draw, speed, mount of time at different speeds, date put into operation, location (e.g., GPS location) and/or time in use. In some embodiments, if any of the monitoring components are disconnected and/or if a fault condition is sensed, the control system may cause the vehicle to shut down with an indication of the corresponding fault being displayed, recorded and/or transmitted (such as to a control center).

For those embodiments in which a vehicle is associated with a designated zone of use, GPS location information may be used to provide an alert if such a vehicle is moved outside of the designated zone. This functionality may also be used if the vehicle is moved when movement is not supposed to be taking place. By way of example, if it is determined that the vehicle is being moved while not under its own power, the position monitoring system may send an alert, which may include information corresponding to the vehicle identification and current location. A separate battery may be used in some embodiments for powering the GPS component(s) and/or communication component(s) to facilitate this functionality. A system lock may also be provided that enables the vehicle control system to be enabled/disabled either directly (i.e., manually via interaction with a physical interface on the vehicle) or remotely (e.g., via communication of information, such as using Bluetooth).

An embodiment of a docking station is depicted in FIGS. 15-17 and 19. In particular, docking station 300 incorporates a base 302, which includes an upper planar surface 304, a guide assembly 306 and a charging connector 308. Upper planar surface 304 is configured to provide a suitable surface upon which first wheel 206, second wheel 208 and idler wheel 210 can drive and be positioned when personal transportation vehicle 200 is in a docked position (shown in FIGS. 15 and 19) at docking station 300.

Charging connector 308 is disposed above upper planar surface 304 and is configured to mate with a corresponding charging port 310, which is disposed at the front of vehicle 200 (see, FIG. 6, for example), for charging one or more batteries of the vehicle when in a docked position. In some embodiments, charging port 310 is a female charging port that is configured to receive male charging connector 308, which may be non-rigid to permit movement to align with the charging port during coupling. In some embodiments, at least one of the charging connector 308 and charging port may incorporate magnetized features to promote a self-alignment during coupling.

Figure 18:
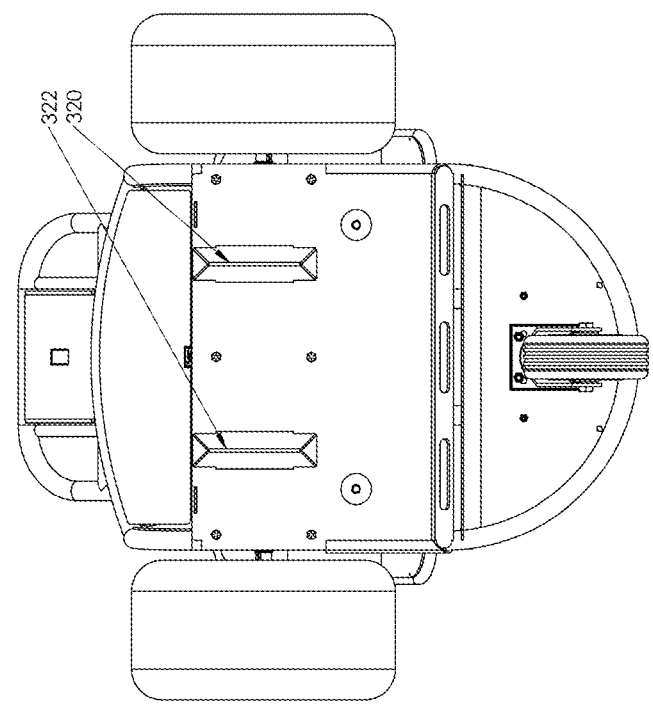
FIG. 18 is a bottom view of the embodiment of the personal transportation device of FIGS. 2-10.

Guide assembly 306 incorporates a pair of guide arms (312, 314) that are disposed above the upper planar surface and extend away from charging connector 308. The guide arms are configured to align a personal transportation vehicle for docking with docking station 300. Specifically, each of the guide arms defines a corresponding a guide channel (316, 318) that is configured as an upwardly open trough. Personal transportation vehicle 200 incorporates downwardly depending guide rails (320, 322) that are disposed on an underside of the vehicle and which are positioned between first wheel 206 and second wheel 208 (see, FIGS. 6 and 18, for example). Each of the guide rails is configured to be received within a corresponding guide channel to align the vehicle with the docking station and, more specifically, to align charging port 310 with charging connector 308. It should be noted that, if a docking station is not available, a vehicle may be charged in other ways, such as with a travel charger.

In some embodiments, once a vehicle is attached to a docking station, the vehicle goes into a hibernation mode until called on for the next use (e.g., in response to a command signal). Information corresponding to a current status of a vehicle (e.g., hibernation, ready-to-use status, etc.) may be displayed on a paired mobile device such as via the executing application. Additionally or alternatively, information corresponding to the current level of battery charge may be provided. Notably, in some embodiments, a vehicle may not be permitted to change status from hibernation to ready-to-use unless the vehicle is determined to have enough battery capacity. This may involve a battery capacity corresponding to travel to a farthest location on the vehicle's travel map. By way of example, the maximum travel distance (i.e., distance from the current location to the farthest location and back) multiplied by a safety factor (e.g., 3×) may be assessed with respect to anticipated travel time and/or distance. If the battery capacity is not determined to b sufficient, the vehicle may remain in the hibernation status.

In some embodiments, a docking station may be operated at a pre-set location, which may be established by GPS coordinates, at an approved electrical source where a vehicle may be trained to return. In some embodiments, mapping of the area (e.g., setting operational boundaries) may be used to facilitate ease of approach and/or docking. A vehicle may also be manually driven to a docking station, a procedure that may be used for training/mapping. In embodiments of a personal transportation system that include multiple docking stations in the same vicinity, a vehicle may be programmed to dock at an unoccupied docking station. In some embodiments, this may involve communication of information related to docking station availability (e.g., an alert) from a docking station to a vehicle as appropriate.

Figure 20:
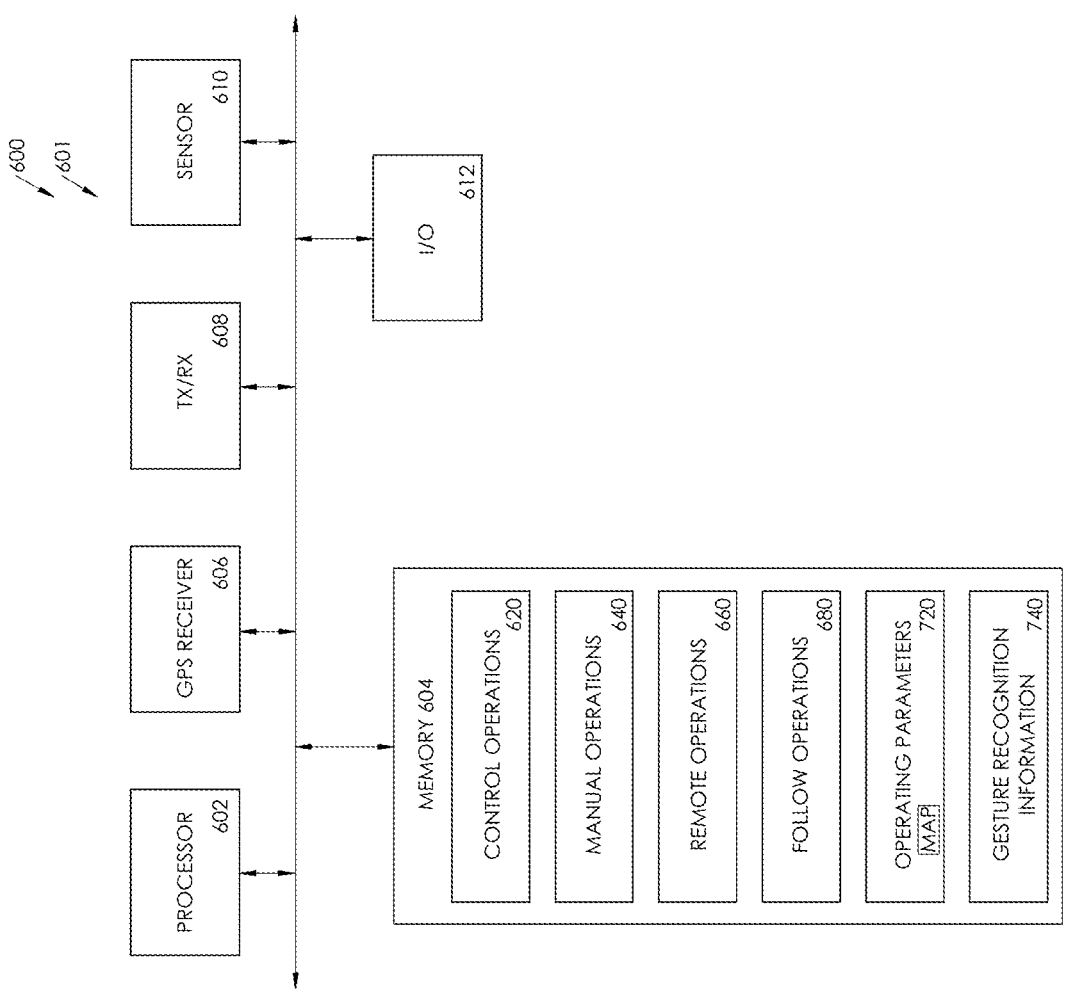
FIG. 20 is a schematic diagram of an example embodiment of a computer-implemented system that may be used to perform functionality associated with an example embodiment of a personal transportation system.

Various functionality associated with a personal transportation system can be implemented in hardware, software, firmware, or a combination thereof. In some embodiments, a controller (such as controller 130 shown in FIG. 1) for performing functionality associated with a personal transportation vehicle can be implemented computer-executable instructions that are stored in a memory and that are executed by a suitable instruction execution system. An example of such an implementation is depicted in FIG. 20, in which a personal transportation vehicle 600 is shown as incorporating a controller 601 that includes a processor 602, a memory 604 and various input/output (I/O) devices. Notably, in this embodiment, several I/O are shown in detail, such as GPS receiver 606, transmitter/receiver 608 (e.g., a Bluetooth tx/rx), and sensor 610 (e.g., an optical sensor); however, different I/O may be incorporated alternatively or in addition to those shown (represented by I/O 612).

Processor 602 may include a custom made or commercially available processor, a central processing unit (CPU) or an auxiliary processor among several processors, a microprocessor, a semiconductor-based microprocessor (in the form of a microchip), one or more application specific integrated circuits (ASICs), a plurality of suitably configured digital logic gates, and other electrical configurations comprising discrete elements both individually and in various combinations to coordinate the overall operation of the system.

Memory 604 can include any one or a combination of volatile memory elements (e.g., random-access memory (RAM, such as DRAM, and SRAM, etc.)) and nonvolatile memory elements. The memory typically comprises a native operating system, one or more native applications, emulation systems, or emulated applications for any of a variety of operating systems and/or emulated hardware platforms, emulated operating systems, etc. One of ordinary skill in the art will appreciate that the memory 604 can, and typically will, comprise other components which have been omitted for purposes of brevity. Note that in the context of this disclosure, a non-transitory computer-readable medium stores one or more programs (computer-implemented instructions) for use by or in connection with an instruction execution system, apparatus, or device. Such computer-implemented instructions may include those associated with control operations 620, manual operations 640, remote operations 660 and follow operations 680, various segments of which may be executed independently and/or in combination to provide the desired functionality. Notably, operating parameters 720 and gesture recognition information 740 also are stored in memory in this embodiment. In operation, the computer-implemented instructions stored in memory 604 are executed by processor 602.

Figure 21:
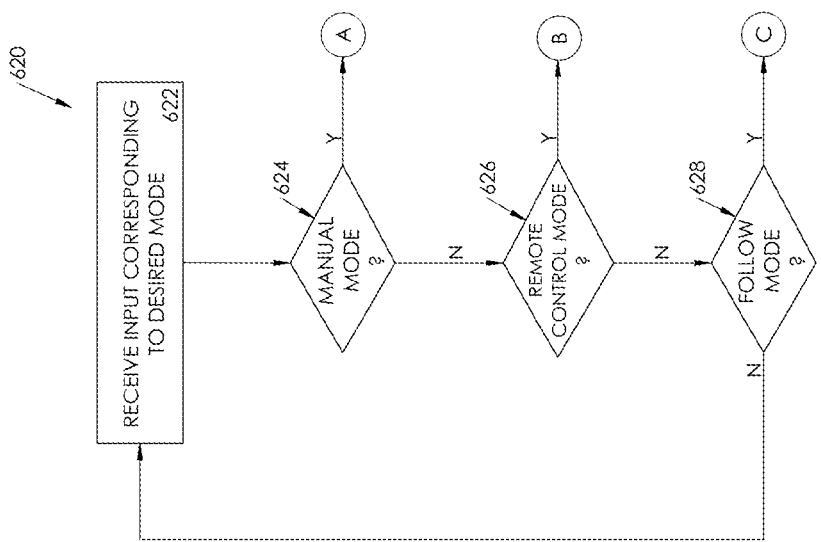
FIG. 21 is a flowchart showing a method (functionality) associated with an example embodiment of a control operations system.

In this regard, FIG. 21 is a flowchart depicting an embodiment of a method (functionality) that may be associated with control operations 620 for enabling selective control of a personal transportation vehicle in the automatic or manual modes. It should be noted that the functional blocks depicted in this (or any other of the figures) may be executed in a different order in other embodiments depending on the application.

Recall that, in the automatic mode, a personal transportation vehicle may be driven responsive to information received from outside of the personal transportation vehicle. As shown in FIG. 21, the method (or process) associated with control operations 620 may be construed as beginning at block 622, in which information corresponding to a desired mode of operation is received. In the present embodiment, this may involve transmitter/receiver 608 (e.g., a Bluetooth tx/rx) receiving information from a mobile device of a user that has been paired to personal transportation vehicle 600. In block 624, a determination is made as to whether the information corresponds to a manual mode of operation. If the determination is affirmative, the process may proceed as indicated (i.e., to "A", also shown in FIG. 22). If, however, the determination is negative, the process may proceed to block 626, in which a determination is made as to whether the information corresponds to a remote control mode of operation. If the determination is affirmative, the process may proceed as indicated (i.e., to "B", also shown in FIG. 23). If, however, the determination is negative, the process may proceed to block 628, in which a determination is made as to whether the information corresponds to a follow mode of operation. If the determination is affirmative, the process may proceed as indicated (i.e., to "C", also shown in FIG. 24). If, however, the determination is negative, the process may return to block 622.

Figure 22:
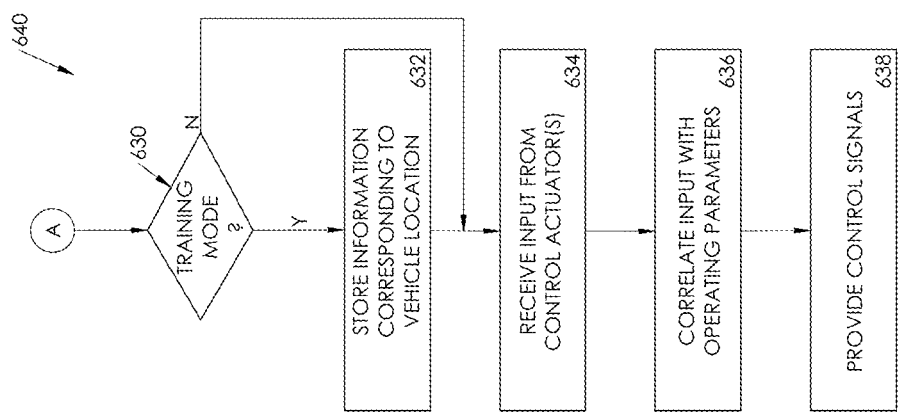
FIG. 22 is a flowchart showing a method (functionality) associated with an example embodiment of a manual operations system.

Based on the determination that a vehicle is to be operated in the manual mode (block 624), control functionality may involve process (manual operations) 640 depicted in FIG. 22 in some embodiments. As shown (block 630), a determination is made as to whether the vehicle is to be operated in a training mode. If the determination is affirmative, the process may proceed to block 632, in which information corresponding to the location of the associated vehicle is stored to form a map (e.g., a location database, which may be stored with the operating parameters in some embodiments). Since, in some embodiments, the vehicle is only storing location information when in the training mode, it is important not to deviate from a best (e.g., shortest) path while operating the vehicle because this information will be used by the vehicle (and/or other vehicles accessing the information) when navigating to/from an associated docking station, for example. That is, once a vehicle develops a map, the information forming the map may be shared to other vehicles so that the information may be used without each of the vehicles having to be trained individually.

Use of a map enables a vehicle to navigate by identifying "paths" (streets, for example) that become preferred routes for travel. For instance, when a vehicle receives a command signal to "return home" to a designated docking station, such as may be performed at the end of a period of operational use or in response to the vehicle being at one location for a prolonged (e.g., settable) period of time, the vehicle is enabled to determine its current location and orientation relative to the stored map. Thereafter, the vehicle will travel toward the closest path of the map and then complete travel home using mapped paths. As will be described in detail later, if there is an obstruction along a path (that is, something that the vehicle determines must be avoided) that cannot be navigated around, the vehicle may proceed to the closest available docking station that appears to be accessible without obstruction.

Returning to FIG. 22 and operation in the manual mode, after setting the training mode (blocks 630 and 632), the process may proceed to block 634. Note also that the functionality of block 634 may be executed if the determination in block 630 is negative. In block 634, input from one or more of the control actuators of the vehicle is received. In block 636, the input is correlated with associated operating parameters. Control signals for controlling movement of the vehicle are then provided in accordance with the operating parameters and input from the control actuators (block 638). In particular, the control signals may be directed to the electric motors to facilitate movement of the vehicle. From block 638, the process may return to one of the aforementioned blocks (block 622 or block 634, for example) and proceed from there as described previously.

Figure 23:
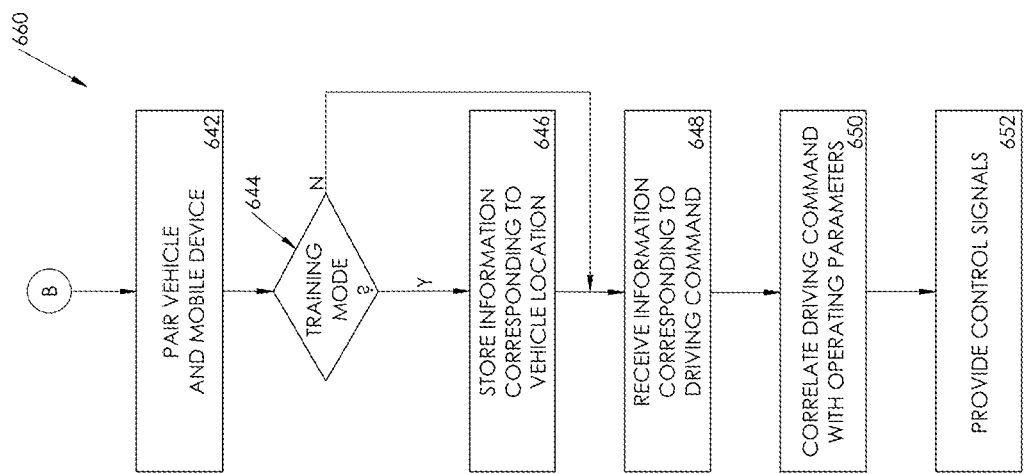
FIG. 23 is a flowchart showing a method (functionality) associated with an example embodiment of a remote operations system.

Based on the determination that a vehicle is to be operated in the remote control mode (block 626 of FIG. 21), in which a dismounted rider (user) can remotely drive the vehicle in any direction, control functionality may involve process (remote operations) 660 depicted in FIG. 23 in some embodiments. As shown in block 642, a vehicle is paired with a mobile device. In block 644, a determination is made as to whether the vehicle is to be operated in a training mode. If the determination is affirmative, the process may proceed to block 646, in which information corresponding to the location of the associated vehicle is stored to form a map.

Thereafter, the process may proceed to block 648, in which information corresponding to a driving command is received by the vehicle from the mobile device. Note also that the functionality of block 648 may be executed if the determination in block 644 is negative. In some embodiments, a "drive" page may be displayed on the mobile device by a corresponding mobile device application that is used to direct movement of the vehicle. For instance, the drive page may incorporate a forward/reverse and right/left controls for easy operation.

In block 650, the driving command is correlated with associated operating parameters. Control signals for controlling movement of the vehicle are then provided in accordance with the operating parameters and driving command from the mobile device (block 652). From block 652, the process may return to one of the aforementioned blocks (block 622 or block 648, for example) and proceed from there as described previously.

In some embodiments, remote operations 660 is configured to determine the direction the vehicle is traveling in relation to the user. This may be accomplished by comparing location information of the vehicle (which may be provided by GPS receiver 606) to information corresponding to the location of the user (which may be provided to transmitter/receiver 608 from the mobile device) at periodic intervals. Determination of the relative direction of travel may be used to reverse the operation/function of the buttons displayed on the drive page. For example, the right and left turn buttons may reverse depending upon the direction of travel to make the remote operation easier for the user.

In some embodiments, the user is enabled to drive the vehicle to within a predetermined distance to the mobile device of the user. That is, the distance creates a boundary between the mobile device and the vehicle. This functionality may involve interaction with transmitter/receiver 608 to receive information corresponding to current user location (e.g., GPS coordinates provided by the mobile device). In all of the above modes, the distance and speeds are preferably settable, but will come with a factory default setting already in place. In all of the above modes, the unit will have a max speed of approx. 2.5 mph, which can be adjusted down from there by 0% to 100%. Even if the distance exceeds the pre-set separation distance, a vehicle may continue to travel at the same 2.5 mph pace or slower until the vehicle gets within the pre-set range.

Based on the determination that a vehicle is to be operated in the follow mode (block 628 of FIG. 21), in which the personal transportation vehicle is controlled to maintain a preset distance from the mobile device, control functionality may involve process (follow operations) 680 depicted in FIG. 24 in some embodiments. As shown in block 682, a vehicle is paired with a mobile device. In block 684, information corresponding to the location of the user (e.g., GPS location information of the mobile device) is received. In block 686, location of the vehicle is determined and, in block 688, a distance between the user and the vehicle is determined. For instance, the information corresponding to the location of the user is compared to location information associated with the vehicle. If (block 690) it is determined that the distance between the user and vehicle corresponds to a distance threshold, the process may proceed to block 692, in which movement of the vehicle is stopped such as by providing corresponding control signals. In some embodiments, the vehicle may remain stopped for a preset duration after which the process may return to block 684, for example. Additionally or alternatively, the "stop" may be overridden by a "go" command from the mobile device, which may also return the process to block 684. If, however, it is determined in block 690 that the distance does not correspond to the threshold, the process may proceed to block 694, in which the vehicle is controlled to approach the location of the user. Thereafter, the process may return to block 684, for example.

It should be noted that some users may not wish to pair the vehicle with their personal mobile device. In such a case, a Bluetooth key fob or some other means to pair to the vehicle may be used.

In some embodiments, a personal transportation vehicle may be configured to acquire information corresponding to user gestures that may be used to control movement of the vehicle. In some embodiments, a sensor 610 (e.g., a LIDAR assembly) may be used to acquire the information. By way of example, when in the follow mode, a controller may be configured to determine the presence of a first user gesture (information which may be stored in gesture recognition information 740) corresponding to a "stop" command. In some embodiments, such a command may correspond to a raised hand of a user. Responsive to determining that the information acquired by the LIDAR assembly corresponds to the "stop" command, the controller may provide control signals to stop movement of the vehicle. Various other gestures may be recognized, such as "come" (user waving hand from side to side, "turn left/right" (arm of user extended outwardly from the side and pointing to the left/right), among possible others.

Preferably, the distance that the vehicle will follow the user is settable (such as from the mobile device) and this feature can be turned on and off as desired.

In some embodiments, a vehicle may incorporate optical and mass sensors to recognize if an obstruction, ravine or mass gets between the user and the vehicle while in the follow mode. The size of the obstruction and if it should be avoided will be determined by the technology or sensors available. In the event that the obstruction is too large to pass over, the vehicle will attempt to maneuver around the obstruction to stay within the distance that is pre-set for following. If the vehicle is unable to proceed using those parameters, the controller will stop the vehicle.

Various functions, functional components and/or blocks have been described herein. As will be appreciated by persons skilled in the art, the functional blocks may be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

Thus, while particular embodiments have been shown and described in detail herein, various modifications may be made without departing from the scope of the present Invention or the appended claims.

What is claimed is:

1. A personal transportation system comprising:
   a personal transportation vehicle defining a front and a rear and having a first wheel, a second wheel, an idler wheel, a platform, a first electric motor, a second electric motor, a first hand grip, a second hand grip, a first control actuator and a second control actuator; and
   a docking station;
   the first wheel and the second wheel being spaced from each other and aligned along an axis;
   the platform being disposed rearward of the axis and configured to support thereon a user in a standing position;
   the idler wheel being disposed rearward of the axis, wherein the first wheel, the second wheel and the idler wheel support the platform;
   the first electric motor being configured to drive the first wheel;
   the second electric motor being configured to drive the second wheel;
   the first hand grip and the second hand grip being fixed in position relative to the platform at respective locations forward of the platform, the first hand grip and the second hand grip being configured to be grasped by the user while in the standing position on the platform;
   the first control actuator being disposed on one of the first hand grip and the second control actuator being disposed on another of the first hand grip and the second hand grip, the first control actuator being operative to control rotations of the first wheel and the second wheel to provide forward and reverse motion of the personal transportation vehicle, the second control actuator being operative to control rotations of the first wheel and the second wheel to provide turning of the personal transportation vehicle, the first control actuator and the second control actuator being configured to be actuated by corresponding thumbs of the user while hands of the user are grasping corresponding ones of the first hand grip and the second hand grip;
   the docking station having a base, a guide assembly and a charging connector;
   the base having an upper planar surface upon which the first wheel, the second wheel and the idler wheel are configured to drive and be positioned when the personal transportation vehicle is in a docked position at the docking station;
   the charging connector being disposed above the upper planar surface, the guide assembly having a guide arm disposed above the upper planar surface and extending away from the charging connector, the guide arm being configured to align the personal transportation vehicle to dock with the docking station, the guide arm defining a guide channel;
   wherein the personal transportation vehicle further comprises a guide rail disposed between the first wheel and the second wheel, the guide rail being configured to be received by the guide channel to align the personal transportation vehicle to dock with the docking station.

2. The personal transportation system of claim 1, wherein the platform is disposed at a height that is higher than a height of the axis.

3. The personal transportation system of claim 1, wherein the personal transportation vehicle further comprises:
   a battery configured to power the first electric motor and the second electric motor; and
   a charging port disposed at the front, the charging port being configured to mate with the charging connector, when the personal transportation vehicle is in a docked position, to receive a charge for recharging the battery.

4. The personal transportation system of claim 1, wherein the first actuator and the second actuator are thumb wheels.

5. The personal transportation system of claim 1, wherein the personal transportation vehicle further comprises a seat movable between a stowed position, in which the seat is disposed forward of the platform and an extended position, in which the seat extends at least partially over the platform.

6. The personal transportation system of claim 1, wherein:
the personal transportation vehicle further comprises a frame assembly configured to support the platform, the first electric motor and the second electric motor; and
the frame assembly is formed of metal tubing.

7. The personal transportation system of claim 1, wherein:
the personal transportation vehicle is selectively operative in a manual mode and an automatic mode;
in the manual mode, the personal transportation vehicle is driven by manual operation of the first actuator and the second actuator; and
in the automatic mode, the personal transportation vehicle is driven responsive to information received from outside of the personal transportation vehicle.

8. The personal transportation system of claim 7, wherein:
the personal transportation vehicle further comprises a controller and a receiver;
the receiver is configured to receive information from a mobile device paired to the personal transportation vehicle; and
the controller is configured to use the information received from the mobile device to drive the personal transportation vehicle when in the automatic mode.

9. The personal transportation system of claim 8, wherein the automatic mode is a remote control mode in which the information provided from the mobile device corresponds to user inputs for driving the personal transportation vehicle.

10. The personal transportation system of claim 8, wherein:
the automatic mode is a follow mode in which the information provided from the mobile device corresponds to GPS location information of the mobile device; and
the controller is configured to use the GPS location information received from the mobile device to drive the personal transportation vehicle to maintain a preset distance from the mobile device.

11. The personal transportation system of claim 10, wherein:
the personal transportation vehicle further comprises a LIDAR assembly configured to acquire information corresponding to user gestures; and
when in a follow mode, the controller is configured to determine presence of a first user gesture corresponding to a stop command, responsive to which the controller pauses driving of the personal transportation vehicle to maintain the preset distance from the mobile device.

12. The personal transportation system of claim 11, wherein:
the LIDAR assembly is further configured to acquire information corresponding to an obstruction located along a travel path of the personal transportation vehicle; and
the controller, responsive to receipt of the information, is configured to drive the personal transportation vehicle to avoid the obstruction.

13. The personal transportation system of claim 1, wherein:
the personal transportation vehicle is a first personal transportation vehicle; and
the personal transportation system further comprises a second personal transportation vehicle.

14. The personal transportation system of claim 13, further comprising a control center operative to receive information from the first personal transportation vehicle and the second personal transportation vehicle.

* * * * *